UNITED STATES PATENT OFFICE.

HARRY ESMOND BROOKBY, OF EVANSTON, ILLINOIS, ASSIGNOR TO UNITED STATES GYPSUM COMPANY, OF CHICAGO, ILLINOIS, A CORPORATION OF NEW JERSEY.

PROCESS OF AGING CALCINED GYPSUM PRODUCTS AND PRODUCT THEREOF.

1,370,581. Specification of Letters Patent. Patented Mar. 8, 1921.

No Drawing. Application filed March 8, 1920. Serial No. 364,323.

*To all whom it may concern:*

Be it known that I, HARRY ESMOND BROOKBY, a citizen of the United States, residing at Evanston, in the county of Cook and State of Illinois, have invented certain new and useful Improvements in the Processes of Aging Calcined Gypsum Products and the Products Thereof, of which the following is a description.

My invention deals with the commercial manufacture and handling of calcined gypsum products. It has for its object a process or method of treating the gypsum, whereby the newly calcined product is aged, in a manner approximating the same condition as warehousing or storing for a considerable period of time after its calcination. The process herein set forth produces substantially the reverse results from those described in an application for Letters Patent heretofore filed by me on January 30, 1920, and serially numbered 355,154.

Its object is to provide a process for treating gypsum preferably during the calcination period, whereby the product is immediately aged and assisted in subsequent absorption of moisture vapor from the air, and thus ages in an accelerated manner.

Calcined gypsum upon being mixed with water chemically combines with substantially from eighteen to twenty-five per cent. of its own weight of water, depending on the character of its calcination and sets in a hard mass. The excess water used to make a flowable or pouring mixture is therefore eliminated by evaporation leaving subsequently a very large number of voids in the product. The strength of the set gypsum is therefore largely dependent upon the amount of these voids.

In "molding" and other similar arts where calcined gypsum products are mixed with water to a pouring consistency and then cast into molds, strong dense castings are desirable. The calcined gypsum being used "neat" in this work, the less water it takes to bring the mass to a pouring consistency; thus less water to be eliminated, and a reduced number of voids in the casts thus afford greater density and strength.

"Molding" is ordinarily of a consistency of about 75 c. c.'s (cubic centimeters) of water when freshly calcined. By this is meant that 100 grams of calcined product requires substantially 75 c. c.'s of water to wet it up sufficiently to secure a pouring consistency. Then, as 100 grams of the calcined plaster will combine with 18 to 25 c. c.'s of water in setting, approximately 57 to 50 c. c.'s of water must be eliminated for every 100 grams of such product. when used while fresh.

On storing the calcined gypsum for about two months, the water consistency figure drops to about 60 c. c.'s thus providing a denser casting. This element of storage is expensive, and at the same time inconvenient to trade conditions. An object of this invention is to produce an equally aged material at substantially the time of calcination, thus eliminating the storage expense, and at the same time to control the aging effect within a desired limit.

In carrying my process into effect, I introduce into the calcining product a suitable "moisture-drawing" or deliquescent substance in such quantities that the calcined material itself is of immediate lower consistency, the aging process of the product is greatly accelerated and the time element for such subsequent aging is very materially reduced. At the same time, the treated material when molded and cast exhibits much finer surface with great freedom from pin holes.

In practical operation, I have secured satisfactory results by employing a highly deliquescent substance in suitable quantities to secure the result desired. By employing such substances a much greater vapor concentration is secured, the deliquescent material acting as a moisture vehicle or carrier to the individual particles. The reagents for this accelerating and aging process are comparatively numerous—organic and inorganic. In practice, I have secured satisfactory results with such substances as calcium and magnesium chlorids, nitrates, and similar substances which are soluble in water and are deliquescent or "water drawing" in action.

It is preferable to use such reagents as are water soluble at ordinary temperatures, and which in solution do not materially affect the physical properties of the calcined product, such as set and hardness.

To give a concrete example of my improved process in the manner in which I prefer to employ it, I would say that I have secured satisfactory results by introducing the ground raw material into the calciner in the usual manner. After the calciner is partly filled and warming, I gradually add, as the rest of the material fills in, generally not to exceed one per cent. by weight of calcium or magnesium chlorid, (dissolved to a saturated solution) to the total amount of raw material in the calciner. The violent agitation of the contents during the calcining operation serves to thoroughly incorporate the deliquescent reagent into the mass. Mechanical agitation of the apparatus may also be employed if desired, and in some cases may be added insurance of thorough mixing.

The calcination during this operation may stop at the "first settle" or be carried to the "second settle" as desired, and the subsequent handling or manipulation of the product may be made in any suitable manner desired for marketing.

In some cases satisfactory results may be secured by simply grinding the deliquescent material with the calcined product, or by simply mixing it as it is ground. The latter method, however, is not as reliable as introducing the deliquescent material into the mass during calcination, and in addition to this the grinding of the deliquescent material referred to creates mechanical difficulties, such as lumping and dampening to an undesirable point.

Commercial adaptability tends to narrow the list of aging reagents on account of the cost, and considering the results sought, together with the thoroughness of the operation, I prefer to use an inorganic deliquescent substance, such as deliquescent chlorids of the alkaline earth metals.

Having thus described my invention, it is obvious that immaterial modifications may be made in the same without departing from the spirit of my invention; hence I do not wish to be understood as limiting mself to the exact steps or proportions above set forth further than is required by the claims hereto annexed.

What I claim as new and desire to secure by Letters Patent is:

1. The process of manufacturing gypsum products consisting in calcining ground gypsum having intimately mixed with it a small amount of soluble deliquescent substance.

2. The process of treating gypsum products, consisting in calcining the gypsum and during the calcining operation adding thereto a predetermined percentage of a deliquescent substance.

3. The process of treating gypsum products, consisting in adding to the gypsum during the calcining process a predetermined percentage of an inorganic deliquescent substance.

4. The process of manufacturing gypsum products consisting in calcining ground gypsum having intimately mixed with it a small amount of a deliquescent chlorid of an alkaline earth metal.

5. The process of treating gypsum products, consisting in adding to the gypsum durign the calcining process of a predetermined percentage of a deliquescent chlorid of alkaline earth metal.

6. The process of treating gypsum products, consisting in adding to the gypsum during the calcining process of less than one per cent. by weight of a deliquescent chlorid of alkaline earth metal.

7. A calcined gypsum product comprising a dry powder of unset commercial plaster of Paris carrying a small amount of water soluble deliquescent substance intimately incorporated.

8. The process of treating gypsum products consisting in adding to the gypsum during the calcining process substantially one-tenth of one per cent. by weight of a deliquescent chlorid of alkaline earth metal.

9. A gypsum product consisting of calcined gypsum being intimately mixed and incorporated therewith less than one per cent. of a deliquescent chlorid of alhaline earth metal.

10. A calcined gypsum product comprising commercial plaster of Paris carrying in intimate association substantially one-tenth of one per cent. of its own weight of a deliquescent chlorid of an alkaline earth metal.

In testimony whereof I have hereunto signed my name in the presence of two subscribing witnesses.

HARRY ESMOND BROOKBY.

Witnesses:
JOHN W. HILL,
BERTHA HARTMANN.